United States Patent
Huang

(10) Patent No.: US 7,684,130 B2
(45) Date of Patent: Mar. 23, 2010

(54) LENS DEVICE

(75) Inventor: Chun-Hung Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 135 days.

(21) Appl. No.: 12/107,823

(22) Filed: Apr. 23, 2008

(65) Prior Publication Data

US 2008/0266674 A1 Oct. 30, 2008

(30) Foreign Application Priority Data

Apr. 25, 2007 (TW) .............................. 96114607 A

(51) Int. Cl.
 *G02B 7/02* (2006.01)
 *G02B 15/14* (2006.01)
(52) U.S. Cl. ....................... 359/813; 359/696; 359/694; 359/822
(58) Field of Classification Search ......... 359/694–704, 359/811–824; 396/33, 345–347, 436
See application file for complete search history.

(56) References Cited

U.S. PATENT DOCUMENTS 7,133,224 B2 * 11/2006 Irisawa ........................ 359/819
7,595,940 B2 * 9/2009 Nuno .......................... 359/813

* cited by examiner

*Primary Examiner*—Mohammed Hasan
(74) *Attorney, Agent, or Firm*—Trop, Pruner & Hu, P.C.

(57) ABSTRACT

A lens device includes a seat unit, a swingable lens module having a guide member, a rotatable cam unit, first and second biasing components, and a first lens module. The swingable lens module is movable relative to the seat unit along an optical axis while the guide member is biased by the first biasing component to abut against a spiral guide surface of the rotatable cam unit. The swingable lens module is pivotable relative to the seat unit about a pivot pin that extends parallel to the optical axis with the guide member being pushed by a pushing surface of the rotatable cam unit to a retreating position, and is biased by a second biasing component toward a retracting position. The first lens module is disposed at one side of the swingable lens module opposite to the seat unit along the optical axis.

12 Claims, 17 Drawing Sheets

LENS DEVICE

CROSS-REFERENCE TO RELATED APPLICATION

This application claims priority of Taiwanese Application No. 096114607, filed on Apr. 25, 2007.

BACKGROUND OF THE INVENTION

1. Field of the Invention

The invention relates to a lens device, more particularly to a retractable lens device.

2. Description of the Related Art

Taiwanese Patent Publication No. I229231 discloses a conventional lens device adapted for use with a camera (not shown). FIGS. 1, 2 and 3 illustrate some elements of the conventional lens device 1 disclosed therein.

The conventional lens device 1 comprises a base plate 11 formed with a guide surface 111, a movable ring 12 having three guide members 121, a swingable lens module 13, and a movable barrel 14. The swingable lens module 13 has a pivot portion 131, a guide block 132 protruding from the pivot portion 131, and a lens unit 133 spaced apart from the pivot portion 131. The movable barrel 14 has an eccentric pivot 141 on which the pivot portion 131 of the swingable lens module 13 is pivoted. The movable barrel 14 further has three guide grooves 142 that engage slidably and respectively the guide members 121 of the movable ring 12 such that the movable barrel 14 is movable relative to the movable ring 12 along an optical axis (Z). The conventional lens device 1 further comprises a cam barrel (not shown) disposed for driving the movable ring 12 to move toward and away from the base plate 11 along the optical axis (Z).

When the camera is turned off, the movable barrel 14 and the movable ring 12 are driven to move toward the base plate 11 along the optical axis (Z). Since the guide block 132 of the swingable lens module 13 abuts slidably against the guide surface 111 of the base plate 11, the movements of the movable barrel 14 and the movable ring 12 drive rotation of the swingable lens module 13 about the eccentric pivot 141 of the movable barrel 14 within the movable barrel 14 to a retreating position (see FIG. 2), where the lens unit 131 of the swingable lens module 13 is away from the optical axis (Z). On the contrary, when the camera is turned on, the movable barrel 14 and the movable ring 12 are driven to move away from the base plate 11 along the optical axis (Z), and the swingable lens module 13 is biased by a torsion spring (not shown) to rotate about the eccentric pivot 141 within the movable barrel 14 to a shooting position (see FIG. 3) relative to the optical axis (Z) with the guide block 132 abutting slidably against the guide surface 111.

However, since the swingable lens module 13 is swingable within the movable barrel 14, the movable barrel 14 has a minimum size requirement for retaining pivotally the swingable lens module 13 therein, thereby obstructing the miniaturization of the conventional lens device 1.

SUMMARY OF THE INVENTION

Therefore, the object of the present invention is to provide a retractable lens device with a relatively small size.

Accordingly, a lens device of the present invention comprises a seat unit, a swingable lens module, a rotatable cam unit, a first biasing component, a second biasing component, and a first lens module. The seat unit has an image sensing component with an optical axis disposed thereon, and a pivot pin extending in a direction parallel to the optical axis. The swingable lens module has a swingable body that has a pivot portion connected pivotally to and movable along the pivot pin of the seat unit and formed with a guide member disposed radially relative to the pivot pin, and a swingable lens unit that is connected to the swingable body. The swingable lens module is movable relative to the seat unit along the optical axis between a shooting position, where the swingable lens unit is distal from the image sensing component of the seat unit, and a retracting position, where the swingable lens unit is proximate to the image sensing component. The swingable lens module is pivotable relative to the seat unit about the pivot pin between the retracting position, where the swingable lens unit is aligned with the image sensing component along the optical axis, and a retreating position, where the swingable lens unit is misaligned with the image sensing position relative to the optical axis. The rotatable cam unit is rotatable on the seat unit about a pivot axis parallel to the pivot pin, and has a spiral guide surface that winds around the pivot axis and that abuts against the guide member of the swingable body of the swingable lens module for driving movement of the swingable lens module between the shooting position and the retracting position, and a pushing surface that is disposed adjacent to one end of the spiral guide surface corresponding to the retracting position and that abuts against the guide member for pushing the swingable body to rotate about the pivot pin from the retracting position to the retreating position. The first biasing component is disposed for biasing the guide member of the swingable body of the swingable lens module to abut against the spiral guide surface of the rotatable cam unit during the movement of the swingable lens module between the shooting position and the retracting position. The second biasing component is disposed for biasing the guide member to the retracting position during the movement of the swingable lens module between the retracting position and the retreating position. The first lens module is disposed at one side of the swingable lens module opposite to the image sensing component of the seat unit along the optical axis.

BRIEF DESCRIPTION OF THE DRAWINGS

Other features and advantages of the present invention will be come apparent in the following detailed description of the preferred embodiments with reference to the accompanying drawings, of which.

DETAILED DESCRIPTION OF THE PREFERRED EMBODIMENTS

Figure 1:
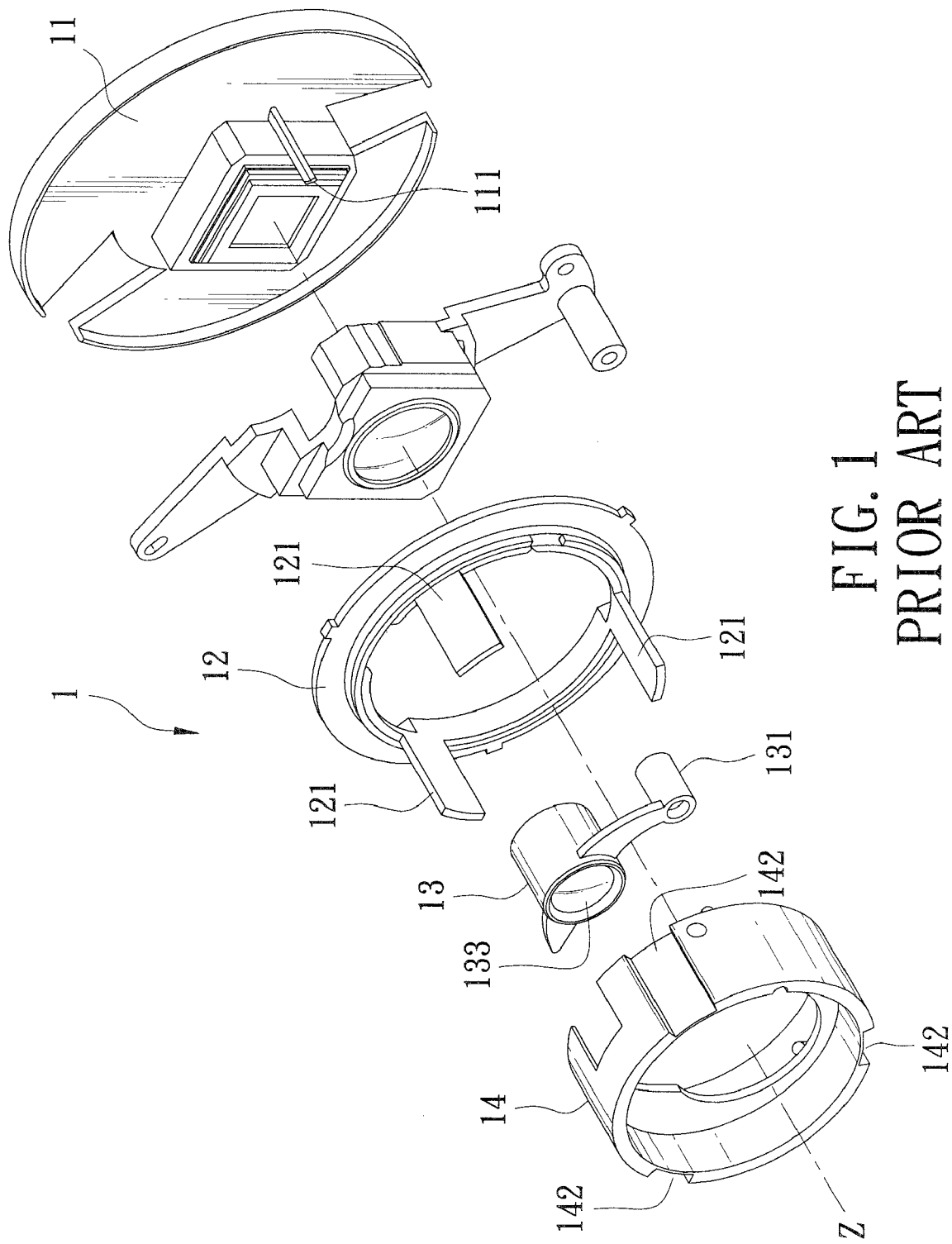
FIG. 1 is a fragmentary exploded perspective view of a conventional lens device.
Figure 2:
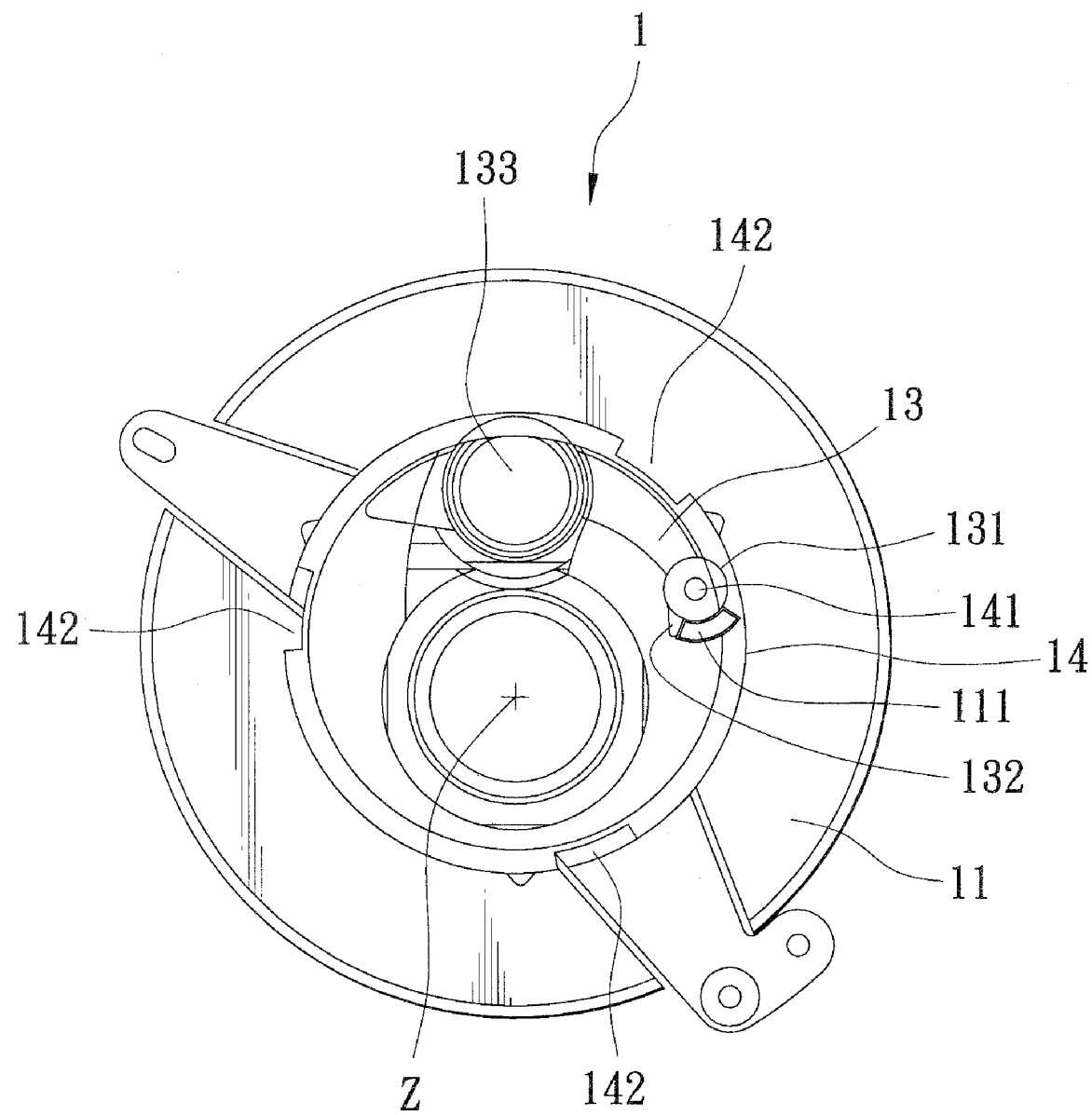
FIG. 2 is a fragmentary assembled schematic view of the conventional lens device, illustrating a swingable lens module thereof at a retreating position.
Figure 3:
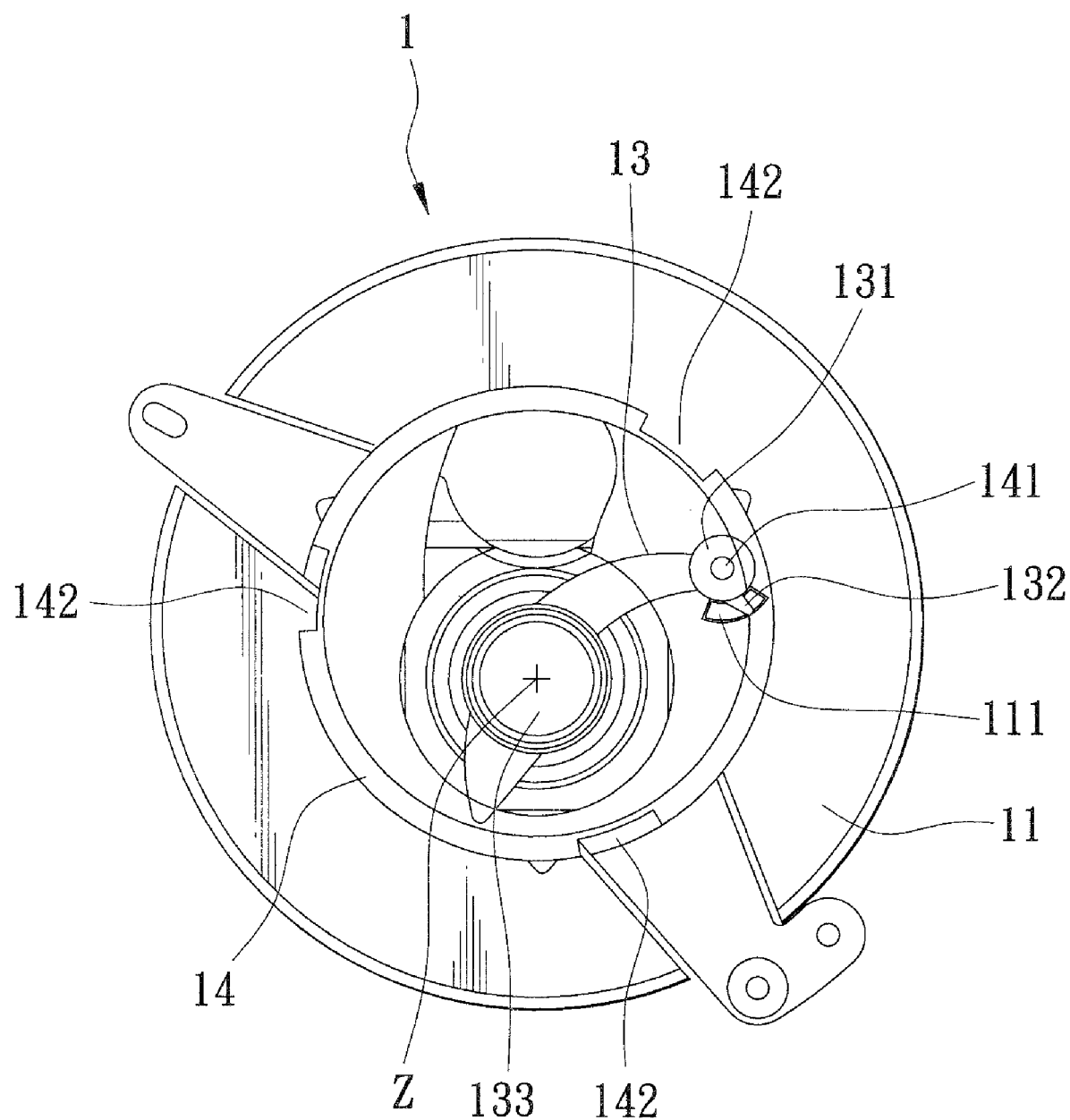
FIG. 3 is a view similar to FIG. 2, but illustrating the swingable lens module at a shooting position.

Before the present invention is described in greater detail, it should be noted that like elements are denoted by the same reference numerals throughout the disclosure.

Figure 4:
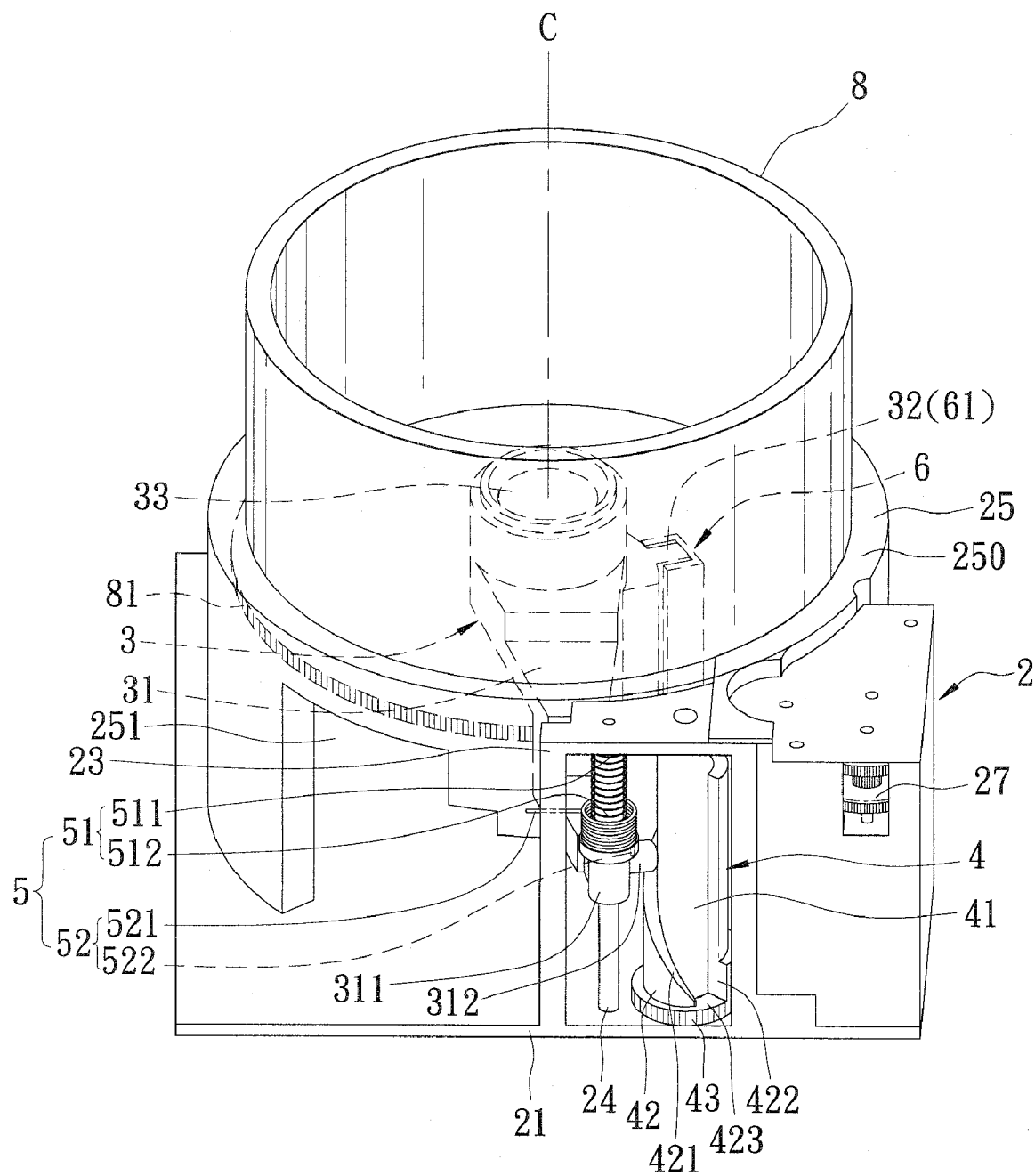
FIG. 4 is a fragmentary assembled perspective view of a first preferred embodiment of a lens device according to the invention.
Figure 5:
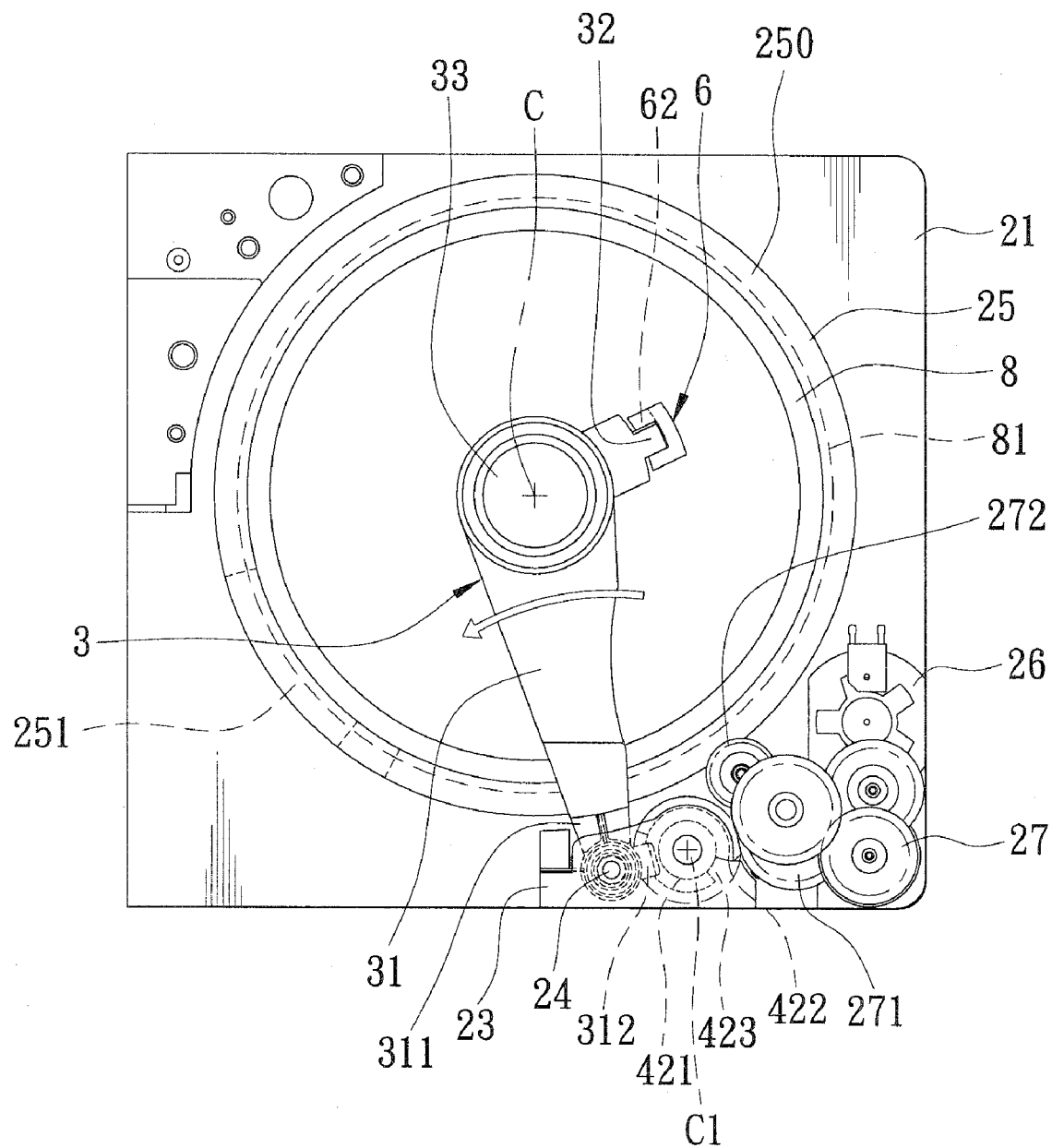
FIG. 5 is a fragmentary assembled schematic view of the first preferred embodiment, illustrating a swingable lens module thereof at a shooting position.
Figure 10:
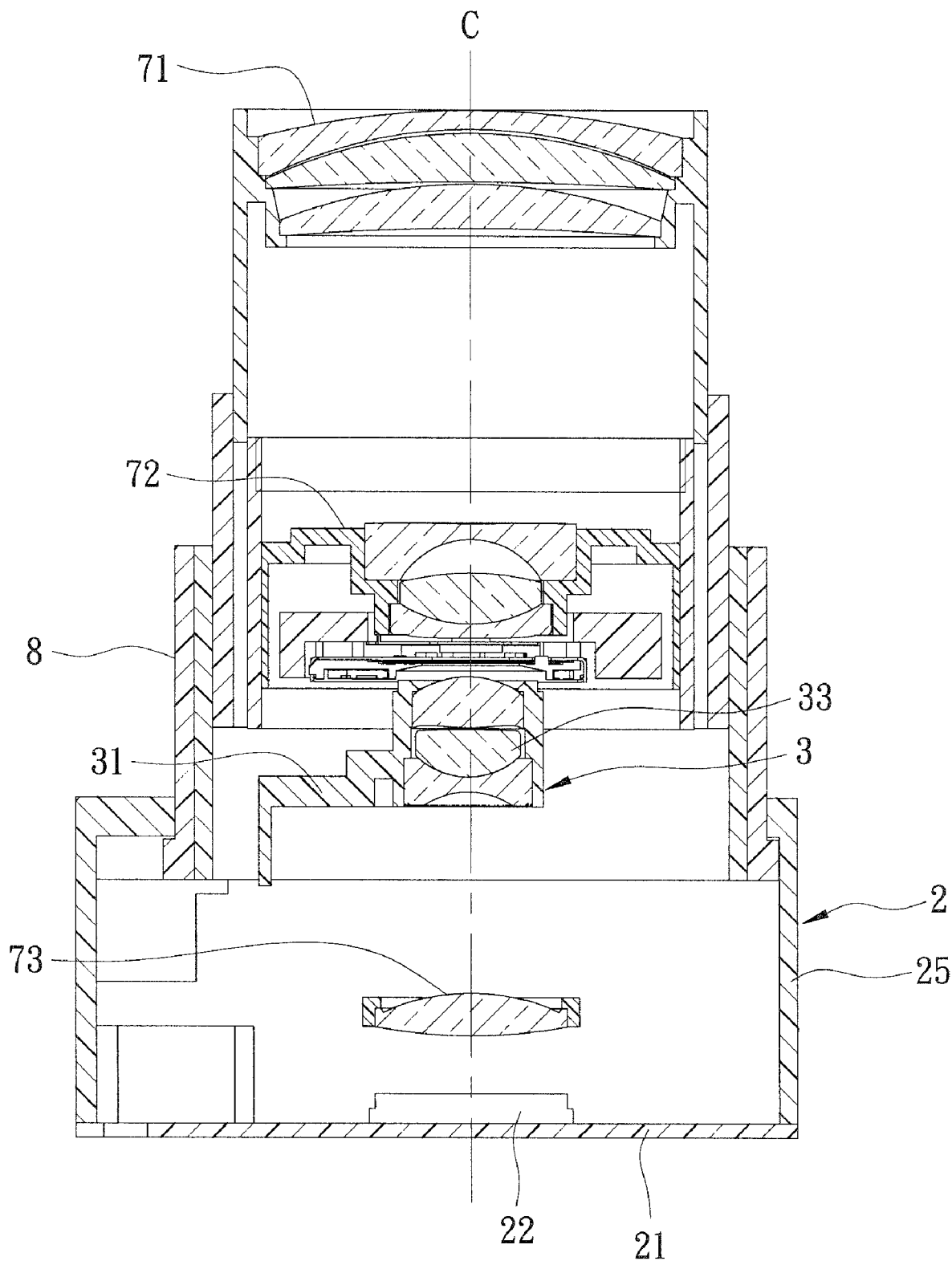
FIG. 10 is a sectional view of the first preferred embodiment, illustrating the swingable lens module at the shooting position.

As shown in FIGS. 4, 5 and 10, the first preferred embodiment of a lens device according to the present invention is adapted for use with a camera (not shown), and comprises a seat unit 2, a swingable lens module 3, a rotatable cam unit 4, a biasing unit 5 including first and second biasing components 51, 52, a guide component 6, a first lens module 71, a second lens module 72, a third lens module 73, and a rotatable barrel 8.

The seat unit 2 has a base plate 21, an image sensing component 22 disposed on the base plate 21, a mounting frame 23 spaced apart from the base plate 21, a pivot pin 24 extending from the base plate 21 in a direction parallel to an optical axis (C) of the image sensing component 22 and extending between the base plate 21 and the mounting frame 23, a stationary barrel 25, a transmission unit 27, and a driving component 26 coupled to the transmission unit 27. The stationary barrel 25 is disposed on the base plate 21 and has a surrounding barrel wall 250 formed with an opening 251. In this embodiment, the image sensing component 22 senses images and transforms them into signals for subsequent processing, the driving component 26 is a motor, and the transmission unit 27 includes a speed reduction gear system having a first gear 271 and a second gear 272.

Figure 6:
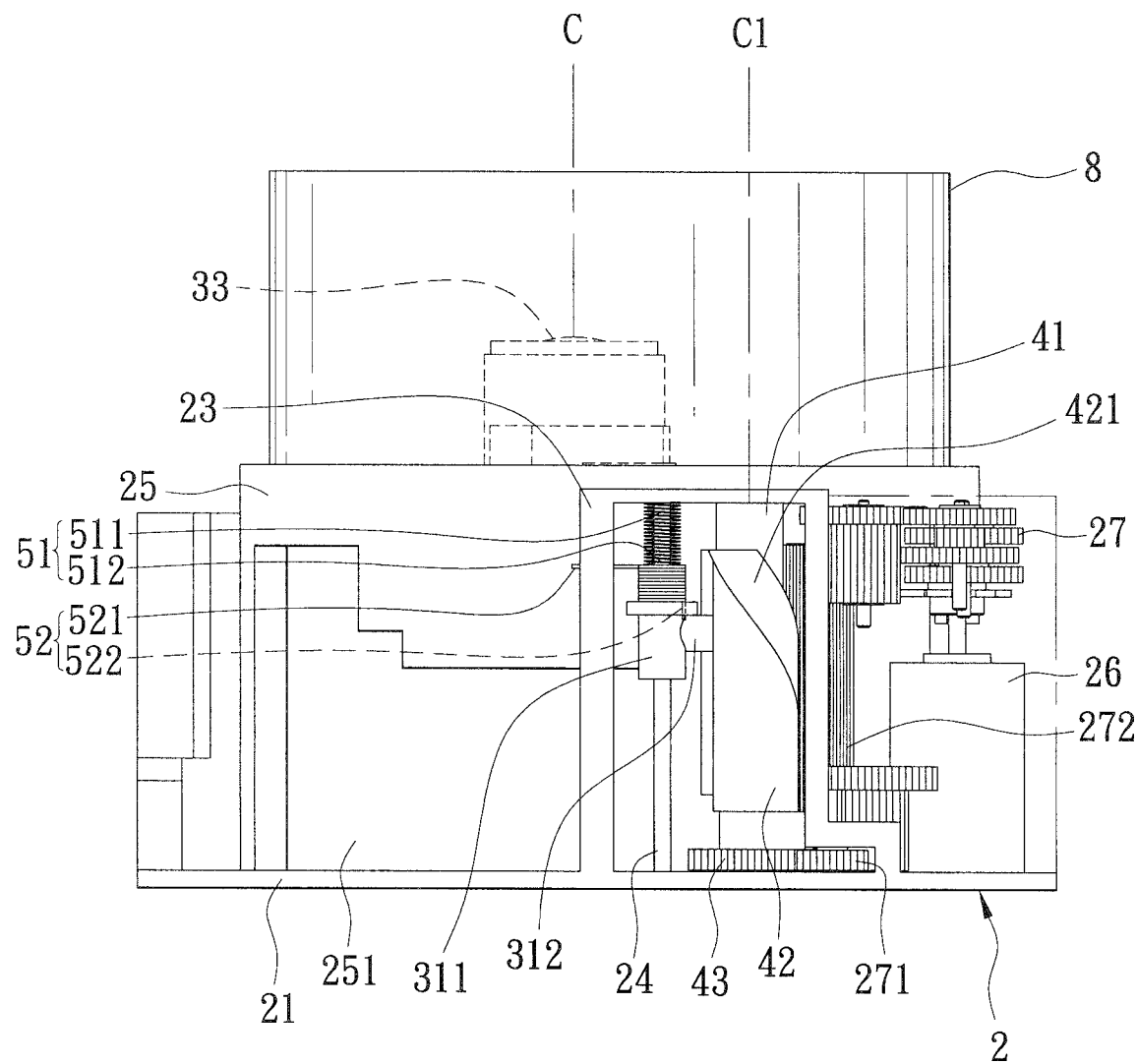
FIG. 6 is a fragmentary schematic side view of the first preferred embodiment, illustrating the swingable lens module at the shooting position.

The swingable lens module 3 has a swingable body 31 that has a pivot portion 311 connected pivotally to and movable along the pivot pin 24 of the seat unit 2 and formed with a guide member 312 disposed radially relative to the pivot pin 24, and a swingable lens unit 33 that is connected to the swingable body 31. In this embodiment, the swingable body 31 has a stepped configuration, and the opening 251 in the surrounding barrel wall 250 of the stationary barrel 25 of the seat unit 2 is in a stepped form corresponding to the swingable body 31. The swingable lens module 3 is movable relative to the seat unit 2 along the optical axis (C) between a shooting position (see FIGS. 4 to 6), where the swingable lens unit 3 is aligned with the image sensing component 22 along the optical axis (C), and is distal from the image sensing component 22 of the seat unit 2, and a retracting position (not shown), where the swingable lens unit 3 is aligned with the image sensing component 22 and is proximate to the image sensing component 22 along the optical axis (C). Moreover, the swingable lens module 3 is pivotable relative to the seat unit 2 about the pivot pin 24 between the retracting position and a retreating position (see FIGS. 7 to 9), where the swingable lens unit 3 is misaligned with the image sensing component 22 relative to the optical axis (C).

The rotatable cam unit 4 extends between the base plate 21 and the mounting frame 23 of the seat unit 2, and is rotatable about a pivot axis (C1) parallel to the pivot pin 24 of the seat unit 2. In this embodiment, the rotatable cam unit 4 has a central post 41, an annular cam portion 42 surrounding the central post 41, and gear teeth 43 meshing with the first gear 271 of the transmission unit 27 of the seat unit 2. The annular cam portion 42 is formed with a spiral guide surface 421 that winds around the pivot axis (C1) and that abuts against the guide member 312 of the swingable body 31 of the swingable lens module 3 for driving movement of the swingable lens module 3 between the shooting position and the retracting position, a pushing surface 422 that is disposed adjacent to one end of the spiral guide surface 421 corresponding to the retracting position and that abuts against the guide member 312 for pushing the swingable body 31 to rotate about the pivot pin 24 from the retracting position to the retreating position, and a connecting surface 423 that interconnects the one end of the spiral guide surface 421 and the pushing surface 422.

In this embodiment, the first biasing component 51 is a compression spring that is sleeved on the pivot pin 24 of the seat unit 2 and that has a first end 511 abutting against the mounting frame 23 of the seat unit 2, and a second end 512 opposite to the first end 511 and abutting against the pivot portion 311 of the swingable body 31 of the swingable lens module 3. The first biasing component 51 is disposed for biasing the guide member 312 of the swingable body 31 to abut against the spiral guide surface 421 of the annular cam portion 42 of the rotatable cam unit 4 during the movement of the swingable lens module 3 between the shooting position and the retracting position.

In this embodiment, the second biasing component 52 is a torsion spring that is sleeved on the pivot pin 24 of the seat unit 2 and that has a first distal section 521 abutting against the mounting frame 23 of the seat unit 2 and a second distal section 522 abutting against the swingable body 31 of the swingable lens module 3. The second biasing component 52 is disposed for biasing the guide member 312 of the swingable body 31 to the retracting position during the movement of the swingable lens module 3 between the retracting position and the retreating position.

Figure 7:
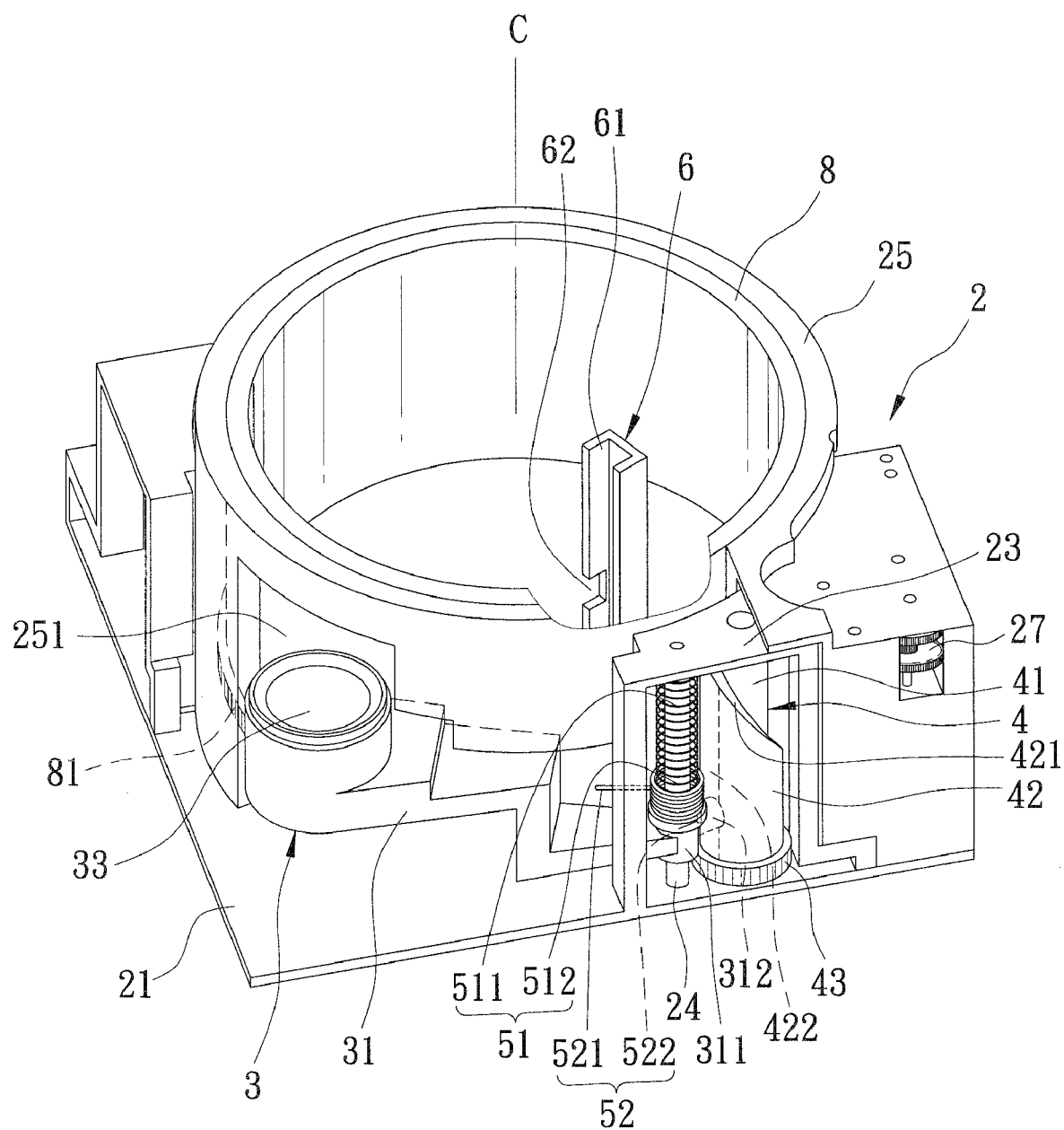
FIG. 7 is another fragmentary assembled perspective view of the first preferred embodiment, illustrating the swingable lens module at a retreating position.

As shown in FIG. 7, the guide component 6 is disposed on the base plate 21 of the seat unit 2, and defines a guide groove 61 parallel to the optical axis (C) therein. During the movement of the swingable lens module 3 between the shooting position and the retracting position, a retaining portion 32 of the swingable body 31 of the swingable lens module 3 is retained slidably in the guide groove 61. The guide component 6 is formed with a notch 62 through which the retaining portion 32 enters the guide groove 61 during the pivoting of the swingable lens module 3 from the retreating position to the retracting position, and through which the retaining portion 32 exits the guide groove 61 during the pivoting of the swingable lens module 3 from the retracting position to the retreating position.

Referring to FIG. 10, in this embodiment, the first lens module 71 is disposed at one side of the swingable lens module 3 opposite to the image sensing component 22 of the seat unit 2 along the optical axis (C). The second lens module 72 is disposed between the first lens module 71 and the swingable lens module 3. The third lens module 73 is disposed between the swingable lens module 3 and the image sensing component 22. In this embodiment, the swingable lens module 3 is a zoom adjustment lens module.

The rotatable barrel 8 has three coupling pins (not shown) retained slidably and respectively in three cam grooves (not shown) in the surrounding barrel wall 250 of the stationary barrel 25 of the seat unit 2. The rotatable barrel 8 further has surrounding teeth 81 meshing with the second gear 272 of the transmission unit 27 of the seat unit 2, such that the rotatable barrel 8 can be driven by the driving component 26 of the seat unit 2 to rotate relative to the stationary barrel 25 and to move toward and away from the base plate 21 of the seat unit 2 along the optical axis (C), thereby driving movements of the first and second lens modules 71, 72 relative to the base plate 21 along the optical axis (C) for zoom adjustment in a conventional manner.

Figure 8:
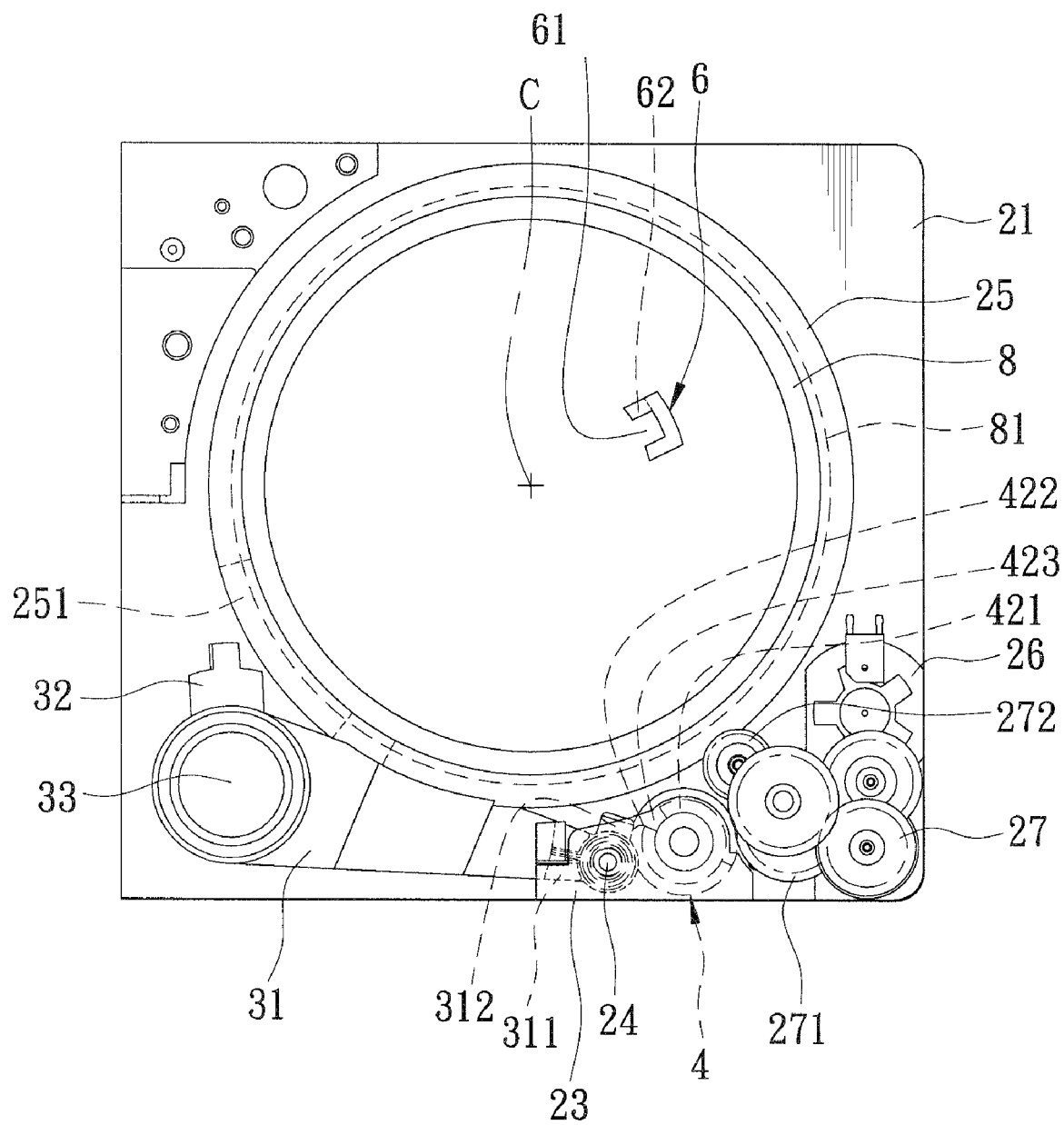
FIG. 8 is a view similar to FIG. 5, but illustrating the swingable lens module at the retreating position.
Figure 9:
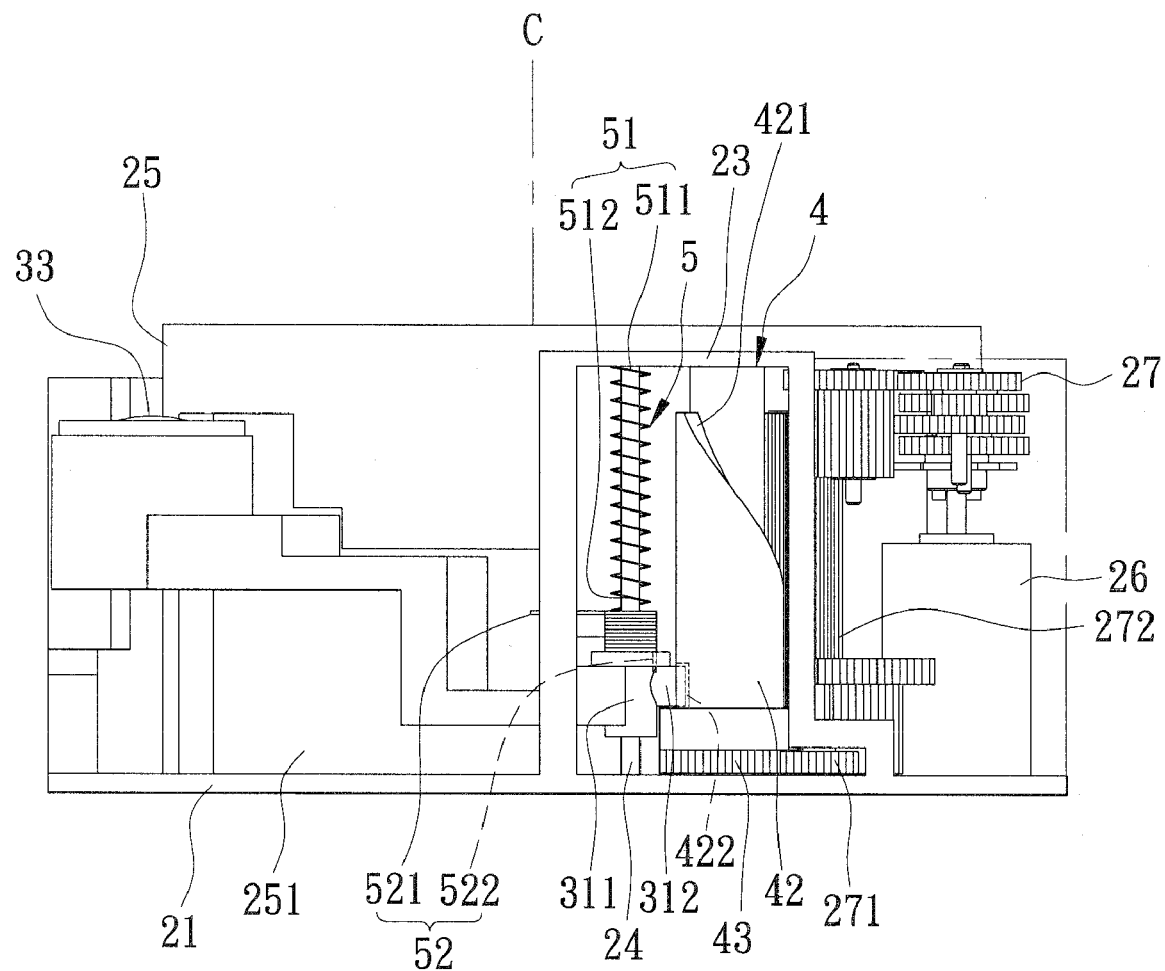
FIG. 9 is another fragmentary schematic side view of the first preferred embodiment, illustrating the swingable lens module at the retreating position.
Figure 11:
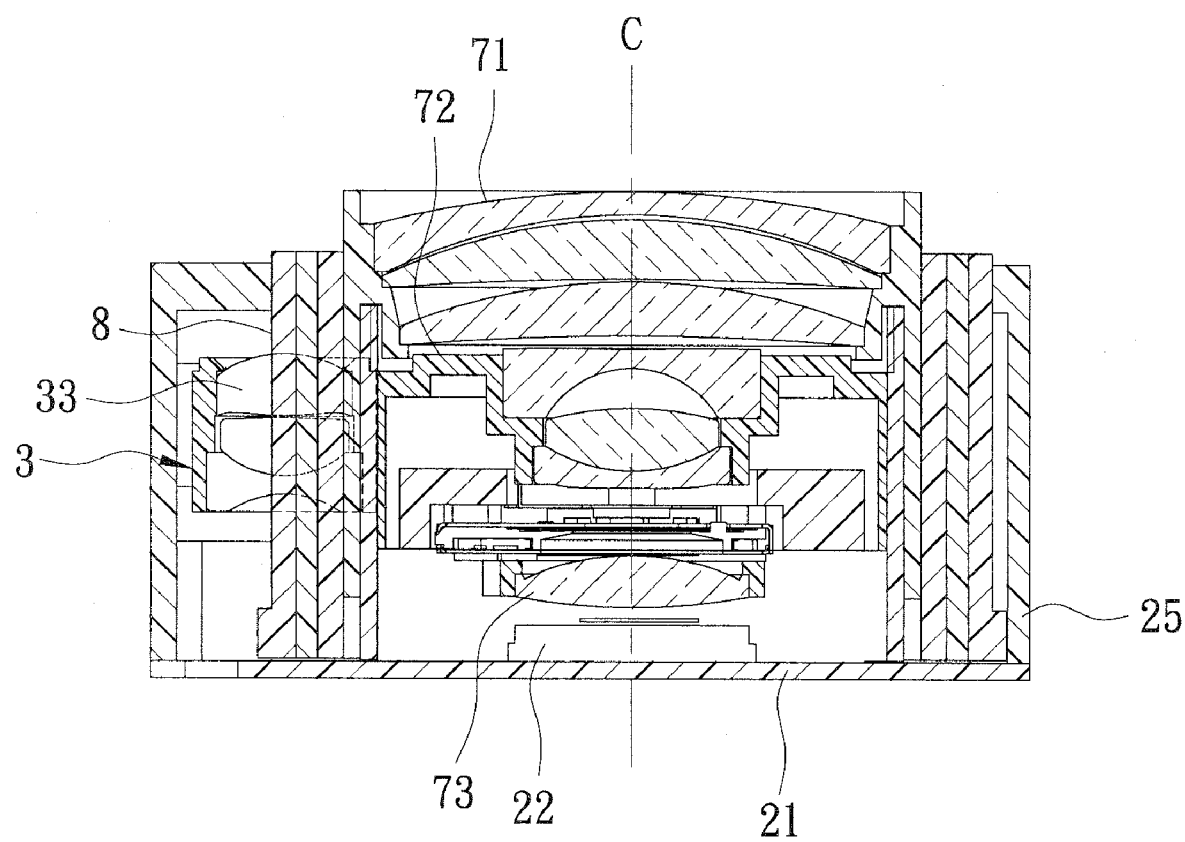
FIG. 11 is another sectional view of the first preferred embodiment, illustrate the swingable lens module at the retreating position.

Referring to FIGS. 7, 8, and 11, when the camera in turned off, the driving component 26 of the seat unit 2 drives the rotation of the rotatable cam unit 4 via the first gear 271 of the transmission unit 27. Since the guide member 312 of the swingable body 31 of the swingable lens module 3 is biased by the first biasing component 51 to abut against the spiral guide surface 421 of the annular cam portion 42 of the rotatable cam unit 4, the swingable lens module 3 is forced to move along the optical axis (C) from the shooting position to the retracting position. At the same time, the rotatable barrel 8 is driven to move toward the base plate 21 along the optical axis (C). When the guide member 312 slides to the connecting surface 423 of the annular cam portion 42, the movement of the swingable lens module 3 along the optical axis (C) is stopped, and the guide member 312 is pushed by the pushing surface 422 such that the swingable lens module 3 is driven to rotate about the pivot pin 24 from the retracting position to the retreating position, where the swingable lens module 3 extends through the opening 251 in the surrounding barrel wall 250 of the stationary barrel 25. During the rotation of the swingable lens module 3 from the retracting position to the retreating position, the second distal section 522 of the second biasing component 52 is twisted for storing restoring energy.

Referring to FIGS. 4, 5, and 10, when the camera is turned on, the driving component 26 of the seat unit 2 drives the rotatable barrel 8 to move away from the base plate 21 of the seat unit 2 along the optical axis (C), and the restoring energy of the second biasing component 52 is released to bias the swingable lens module 3 to rotate about the pivot pin 24 from the retreating position to the retracting position, such that the guide member 312 of the swingable body 3 of the swingable lens module 3 abuts against the spiral guide surface 421 of the annular cam portion 42 of the rotatable cam unit 4, and that the retaining portion 32 of the swingable body 3 enters the guide groove 61 defined by the guide component 6 via the notch 62. Afterward, the rotatable cam unit 4 is driven by the driving component 26 to rotate in a reverse direction, thereby moving the swingable lens module 3 relative to the base plate 21 along the optical axis (C) from the retracting position to the shooting position.

When the swingable lens module 3 is at the shooting position, the swingable lens module 3 can be moved toward and away from the seat unit 2 along the optical axis (C).

Since the swingable lens module 3 is disposed on the seat unit 2 and does not pivot within the stationary barrel 25, the stationary barrel 25 does not have to be designed large enough to correspond to the size of the swingable lens module 3, thereby facilitating the miniaturization of the lens device of the invention. Moreover, by virtue of the rotatable cam unit 4, the swingable lens module 3 can be driven to move relative to the seat unit 2 along the optical axis (C) and can also be driven to rotate relative to the optical axis (C). Therefore, the structure of the lens device of the invention is relatively simple.

It should be noted that the connecting surface 423 of the annular cam portion 42 of the rotatable cam unit 4 may be omitted in other embodiments of this invention. Moreover, the guide component 6 and the retaining portion 32 of the swingable body 31 of the swingable lens module 3 may be omitted in other embodiments of this invention as long as the biasing force of the second biasing component 52 is sufficient to bias properly the guide member 312 of the swingable body 31 of the swingable lens module 3 to abut against the spiral guide surface 421 of the annular cam portion 42 of the rotatable cam unit 4 during the movement of the swingable lens module 3 between the shooting position and the retracting position.

Figure 12:
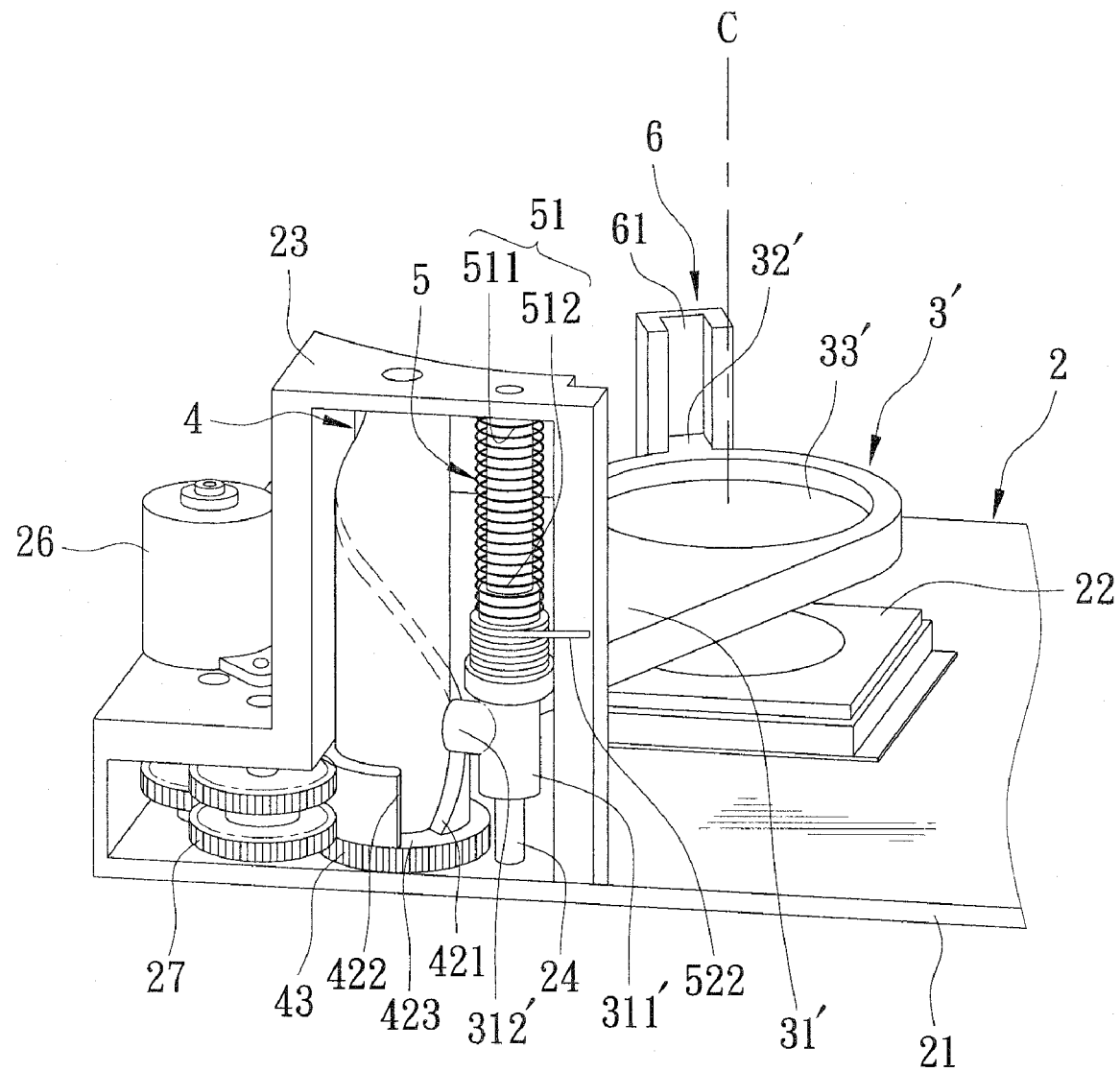
FIG. 12 is a fragmentary assembled perspective view of a second preferred embodiment of a lens device according to the invention, illustrating a swingable lens module thereof at a shooting position.
Figure 13:
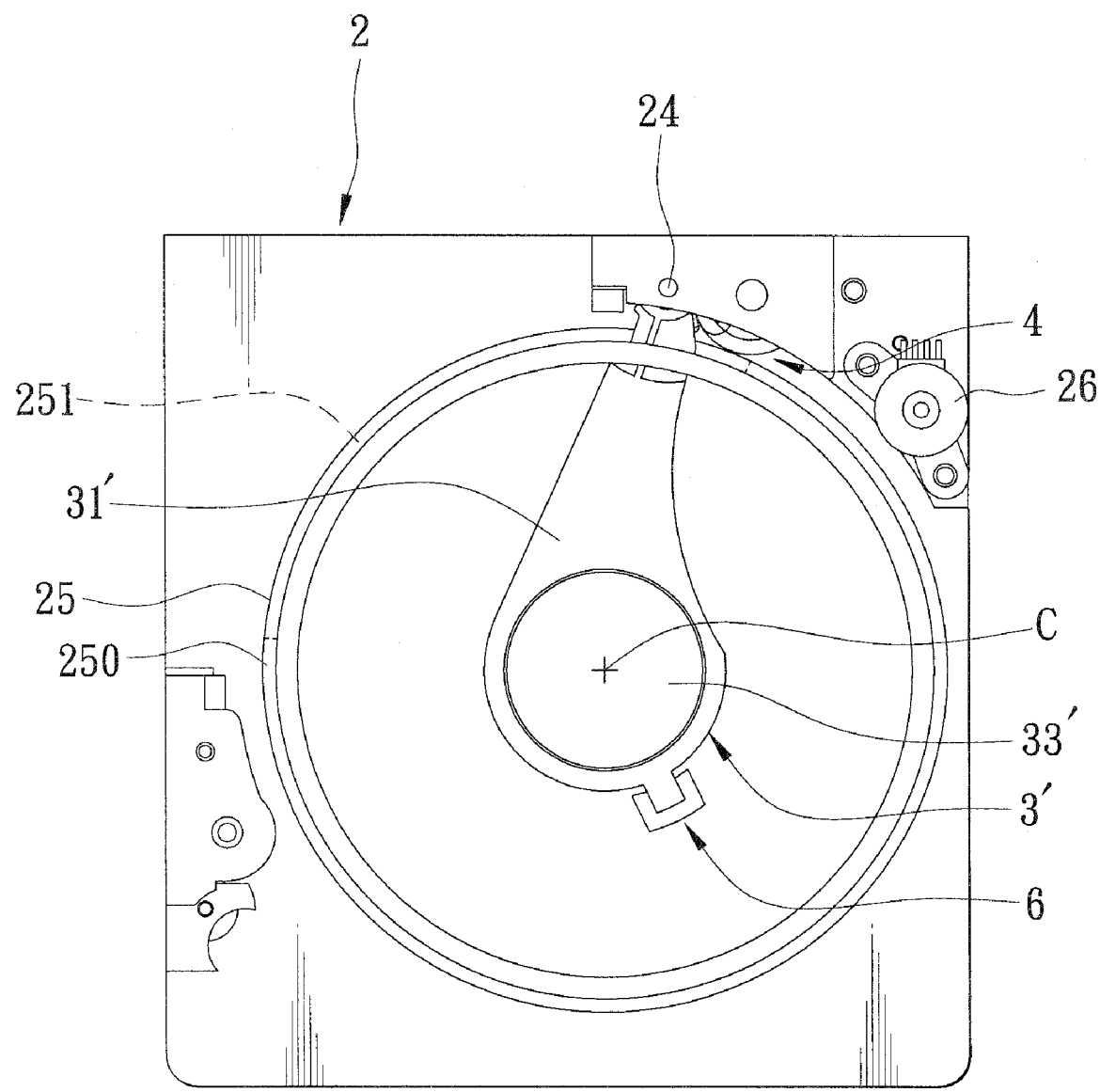
FIG. 13 is a fragmentary schematic view of the second preferred embodiment, illustrating the swingable lens module at the shooting position.
Figure 16:
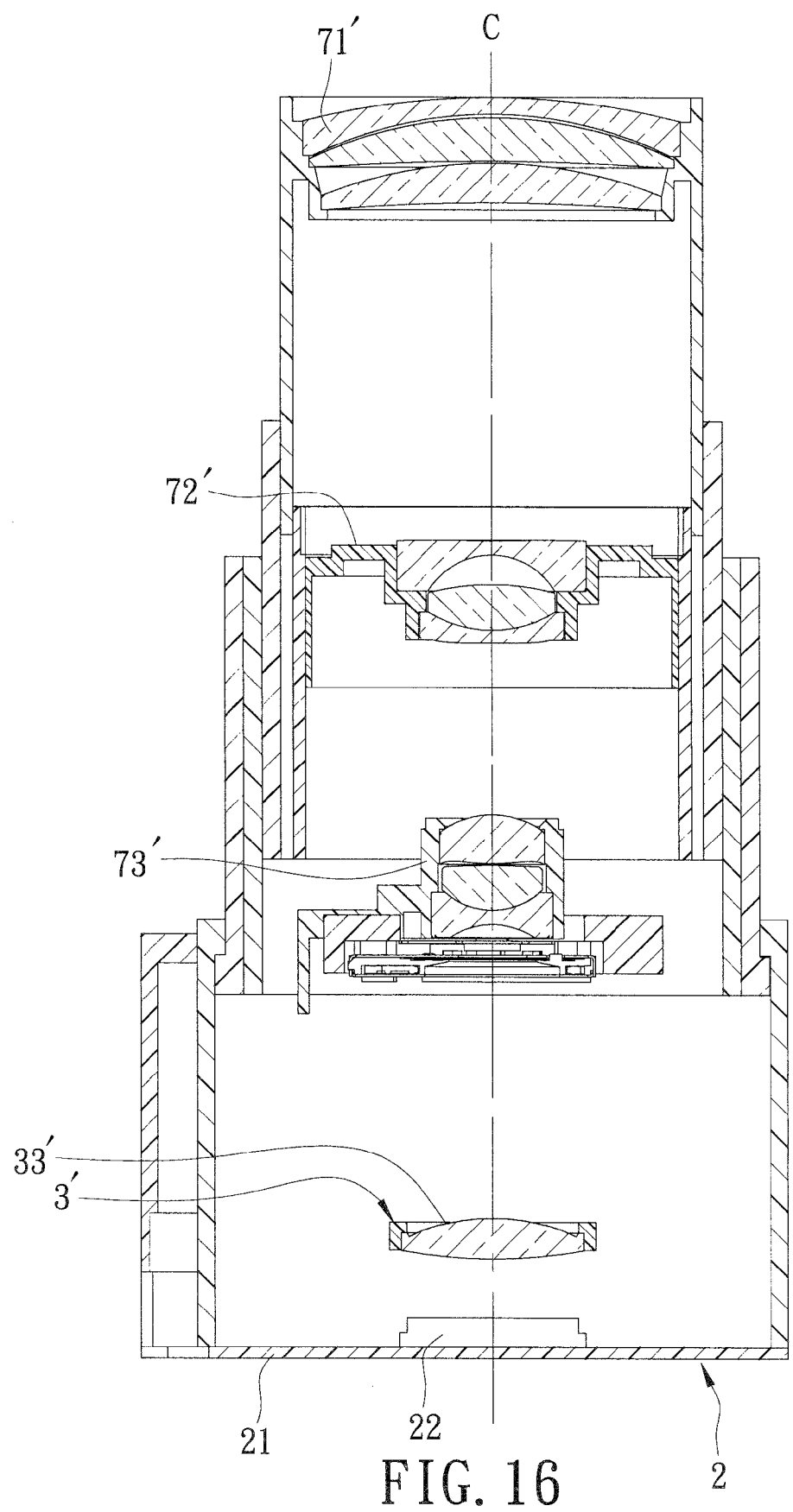
FIG. 16 is a sectional view of the second preferred embodiment, illustrating the swingable lens module at the shooting position.

As shown in FIGS. 12, 13 and 16, the second preferred embodiment of the lens device according to the present invention has a structure similar to that of the first embodiment. The main differences between this embodiment and the previous embodiment reside in the following. The lens device of this embodiment comprises a swingable lens module 3' having a swingable body 31' and a swingable lens unit 33' that is connected to the swingable body 31'. The swingable body 31' has a pivot portion 311' connected pivotally to and movable along the pivot pin 24 of the seat unit 2 and formed with a guide member 312' disposed radially relative to the pivot pin 24. The swingable body 31' further has a retaining portion 32'. In this embodiment, the first lens module 71' is disposed at one side of the swingable lens module 3' opposite to the image sensing component 22 of the seat unit 2 along the optical axis (C). The second lens module 72' is disposed between the first lens module 71' and the swingable lens module 3'. The third lens module 73' is disposed between the swingable lens module 3' and the second lens module 72'. In this embodiment, the swingable lens module 3 is a focus adjustment lens module.

Figure 14:
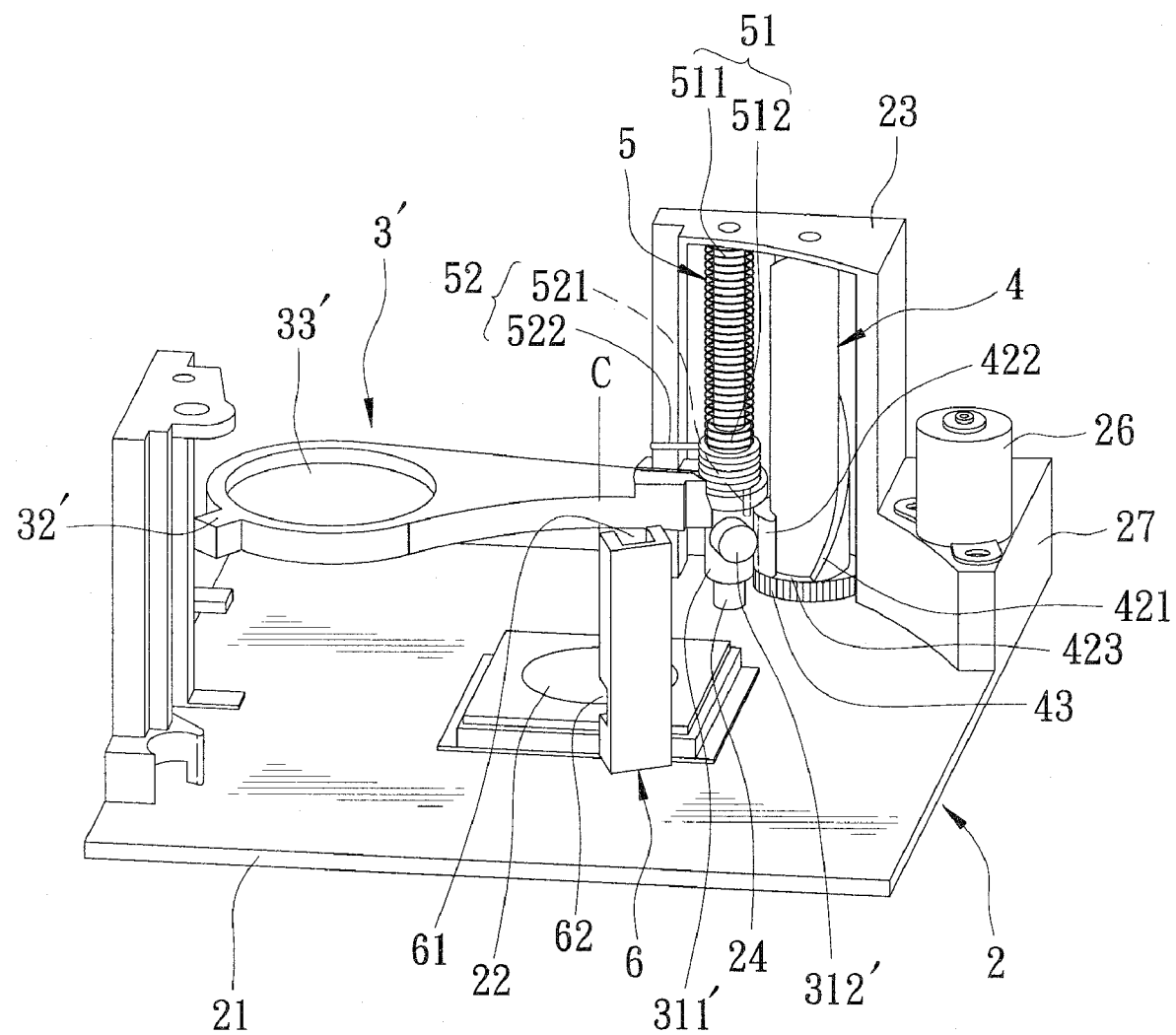
FIG. 14 is another fragmentary assembled perspective view of the second preferred embodiment, illustrating the swingable lens module at a retreating position.
Figure 15:
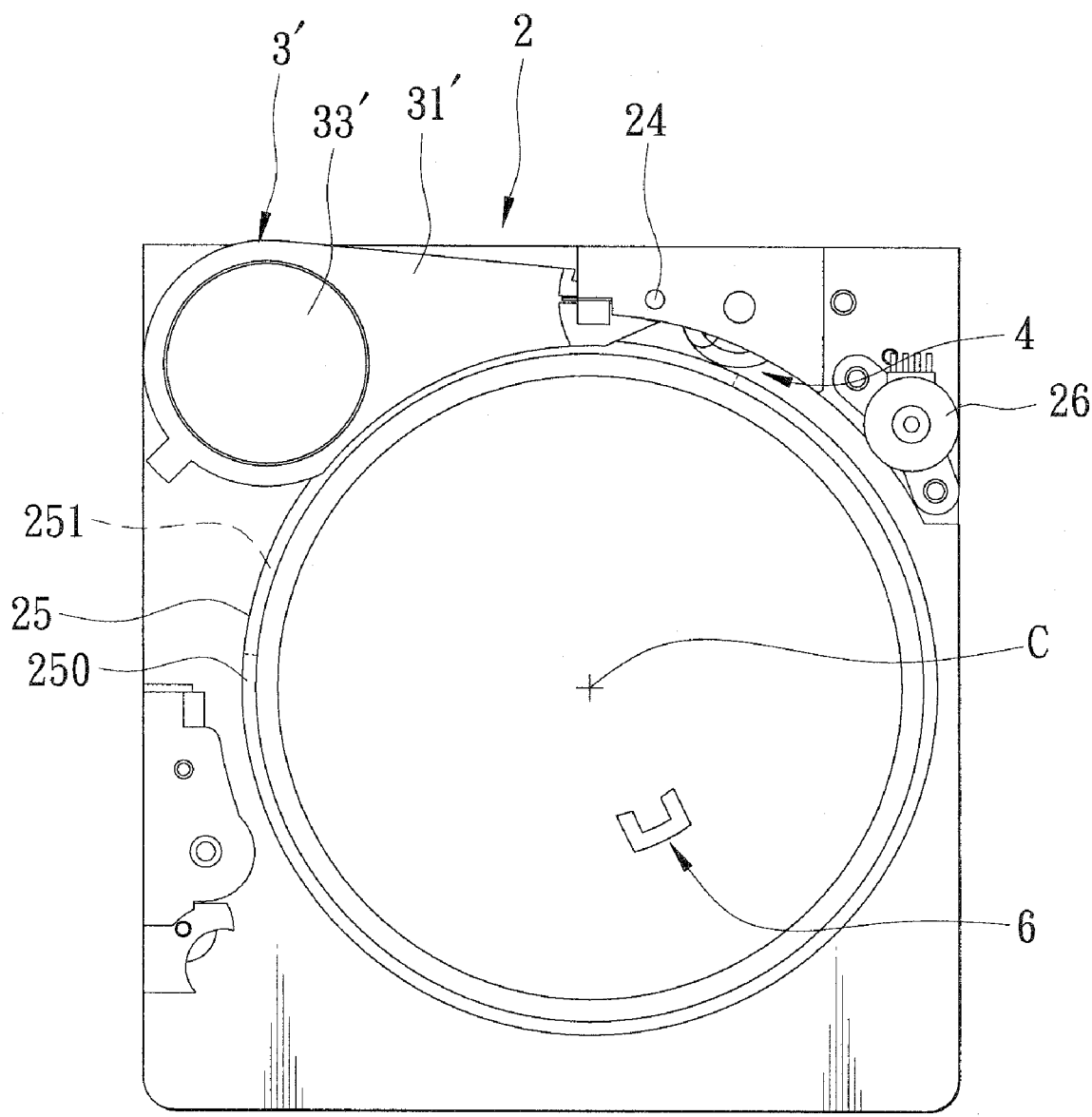
FIG. 15 is a view similar to FIG. 13, but illustrating the swingable lens module at the retreating position.
Figure 17:
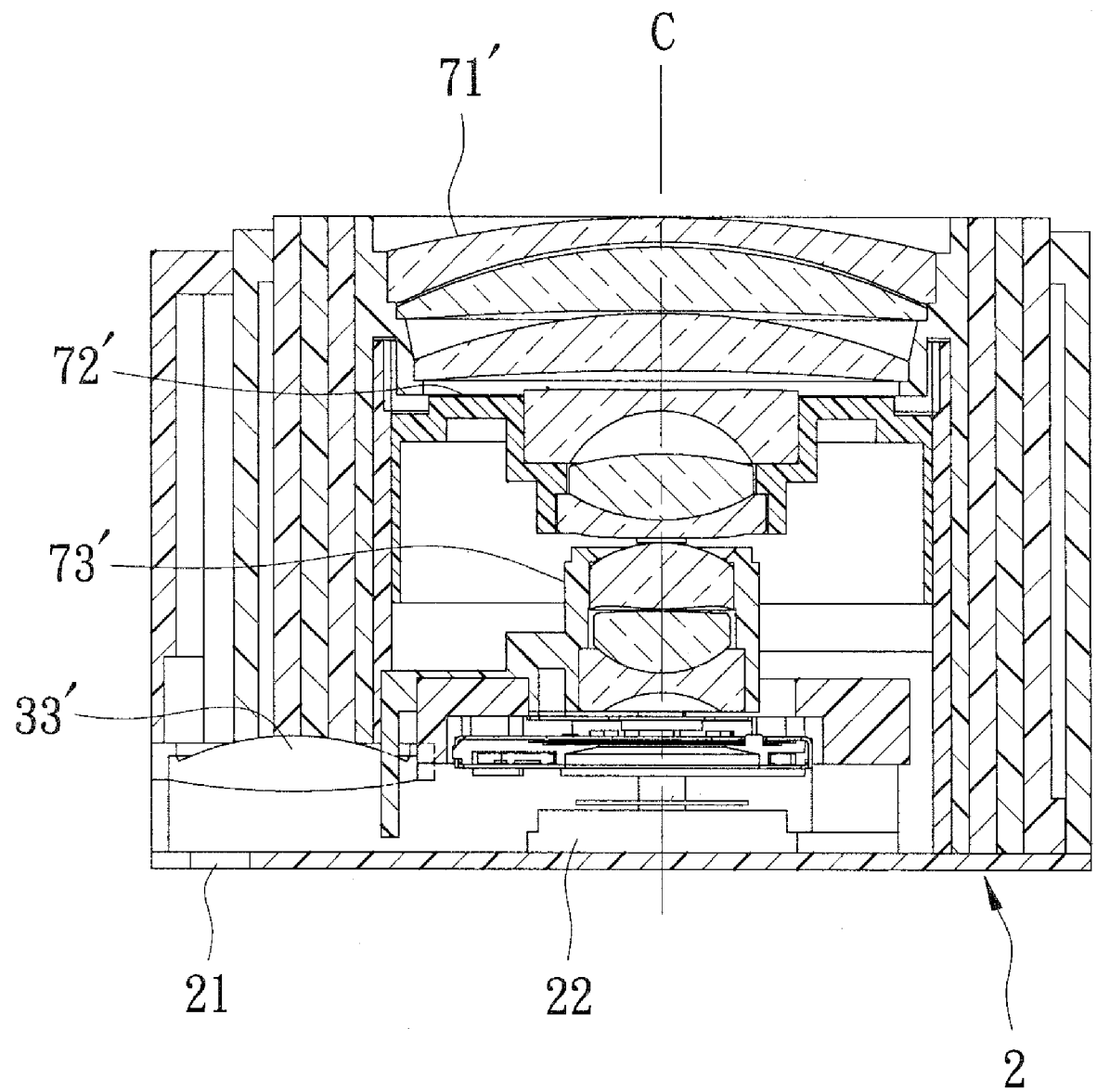
FIG. 17 is another sectional view of the second preferred embodiment, illustrating the swingable lens module at the retreating position.

The swingable lens module 3' is pivotable relative to the seat unit 2 about the pivot pin 24 between a shooting position (see FIGS. 12, 13, and 16), where the swingable lens unit 33' is aligned with the image sensing component 22 along the optical axis (C), and a retreating position (see FIGS. 14, 15, and 17), where the swingable lens unit 33' is misaligned with the image sensing component 22 relative to the optical axis (C) When the camera is turned off, the swingable lens module 3' is driven to move from the shooting position to the retreating position, where the swingable lens module 3' extends through the opening 251 in the surrounding barrel wall 250 of the stationary barrel 25. Contrarily, when the camera is turned on, the swingable lens module 3' is driven to move from the retreating position to the shooting position.

When the swingable lens module 3' is at the shooting position, the rotatable cam unit 4 rotates on the seat unit 2, thereby driving the swingable lens module 3' via the spiral guide surface 421 to move relative to the seat unit 2 along the optical axis (C). During the movement of the swingable lens module 3', the image sensing component 22 generates a plurality of image signals, which are then transformed into a plurality of evaluation values through an image processor (not shown) for focus adjustment. The second preferred embodiment has the same advantages as those of the first preferred embodiment.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A lens device comprising:
   a seat unit having an image sensing component with an optical axis disposed thereon, and a pivot pin that extends therefrom in a direction parallel to the optical axis;
   a swingable lens module having a swingable body that has a pivot portion connected pivotally to and movable along said pivot pin of said seat unit and formed with a guide member disposed radially relative to said pivot pin, and a swingable lens unit that is connected to said swingable body, said swingable lens module being movable relative to said seat unit along the optical axis between a shooting position, where said swingable lens unit is distal from said image sensing component of said seat unit, and a retracting position, where said swingable lens unit is proximate to said image sensing component, said swingable lens module being pivotable relative to said seat unit about said pivot pin between the retracting position, where said swingable lens unit is aligned with said image sensing component along the optical axis, and a retreating position, where said swingable lens unit is misaligned with said image sensing component relative to the optical axis;
   a rotatable cam unit rotatable on said seat unit about a pivot axis parallel to said pivot pin, and having a spiral guide surface that winds around said pivot axis and that abuts against said guide member of said swingable body of said swingable lens module for driving movement of said swingable lens module between the shooting position and the retracting position, and a pushing surface that is disposed adjacent to one end of said spiral guide surface corresponding to the retracting position and that abuts against said guide member for pushing said swingable body to rotate about said pivot pin from the retracting position to the retreating position;
   a first biasing component disposed for biasing said guide member of said swingable body of said swingable lens module to abut against said spiral guide surface of said rotatable cam unit during the movement of said swingable lens module between the shooting position and the retracting position;
   a second biasing component disposed for biasing said guide member to the retracting position during the movement of said swingable lens module between the retracting position and the retreating position; and
   a first lens module disposed at one side of said swingable lens module opposite to said image sensing component of said seat unit along the optical axis.

2. The lens device as claimed in claim 1, wherein said seat unit further has a base plate on which said image sensing component is provided, and a mounting frame that is spaced apart from said base plate, said pivot pin and said rotatable cam unit extending between said base plate and said mounting frame.

3. The lens device as claimed in claim 2, wherein said first biasing component is a compression spring that is sleeved on said pivot pin of said seat unit, and that has a first end abutting against said mounting frame of said seat unit and a second end opposite to said first end and abutting against said pivot portion of said swingable body of said swingable lens module.

4. The lens device as claimed in claim 2, wherein said second biasing component is a torsion spring that is sleeved on said pivot pin of said seat unit, and that has a first distal section abutting against said mounting frame of said seat unit and a second distal section abutting against said swingable body of said swingable lens module.

5. The lens device as claimed in claim 2, wherein:
   said first biasing component is a compression spring that is sleeved on said pivot pin of said seat unit, and that has a first end abutting against said mounting frame of said seat unit and a second end opposite to said first end and abutting against said pivot portion of said swingable body of said swingable lens module; and
   said second biasing component is a torsion spring that is sleeved on said pivot pin, and that has a first distal section abutting against said mounting frame and a second distal section abutting against said swingable body.

6. The lens device as claimed in claim 1, wherein said seat unit further has a transmission unit coupled to said rotatable cam unit, and a driving component for driving rotation of said rotatable cam unit via said transmission unit.

7. The lens device as claimed in claim 6, wherein said driving component is a motor, said transmission unit including a speed reduction gear system, said rotatable cam unit further having gear teeth meshing with said transmission unit.

8. The lens device as claimed in claim 1, wherein said rotatable cam unit further has a central post and an annular cam portion surrounding said central post and formed with said spiral guide surface and said pushing surface.

9. The lens device as claimed in claim 8, wherein said annular cam portion of said rotatable cam unit is further formed with a connecting surface interconnecting said one end of said spiral guide surface and said pushing surface.

10. The lens device as claimed in claim 1, further comprising a guide component disposed on said seat unit and defining a guide groove parallel to the optical axis therein, said swingable body of said swingable lens module further having a retaining portion retained slidably in said guide groove during the movement of said swingable lens module between the shooting position and the retracting position, said guide component being formed with a notch through which said retaining portion of said swingable body enters said guide groove during the pivoting of said swingable lens module from the retreating position to the retracting position, and through which said retaining portion exits said guide groove during the pivoting of said swingable lens module from the retracting position to the retreating position.

11. The lens device as claimed in claim 1, wherein said swingable lens module is a zoom adjustment lens module.

12. The lens device as claimed in claim 1, wherein said swingable lens module is a focus adjustment lens module.

* * * * *